United States Patent
Rak

[11] 3,827,564
[45] Aug. 6, 1974

[54] REVERSE OSMOSIS MEMBRANE MODULE
[75] Inventor: Stanley F. Rak, Mundelein, Ill.
[73] Assignee: Culligan International Company, Northbrook, Ill.
[22] Filed: Jan. 12, 1973
[21] Appl. No.: 323,249

[52] U.S. Cl. ............................... 210/321, 210/494
[51] Int. Cl. ............................................ B01d 31/00
[58] Field of Search .................. 210/321, 494, 497.1

[56] References Cited
UNITED STATES PATENTS
3,367,504  2/1968  Westmoreland ............... 210/494 X
3,455,460  7/1969  Mahon et al ................. 210/497.1 X

*Primary Examiner*—Frank A. Spear, Jr.
*Attorney, Agent, or Firm*—Hill, Gross, Simpson, Van Santen, Steadman, Chiara & Simpson

[57] ABSTRACT

A spiral-wound membrane module for separating a solvent from a solution such as water from an impure solution by means of a reverse osmosis process and a method for making such membrane module. An elongated sheet of semi-permeable membrane material has disposed in juxtaposition to its opposite surfaces, respectively, a sheet of porous product water spacer material and a sheet of a feed water spacer material to provide a three-ply membrane composite which is wrapped around a hollow tubular mandrel. The membrane composite wound around the tubular mandrel is disposed in an outer cover in which at least one opening is provided having its end sealed and extending through a radial axis of the spirally wound membrane composite and a wall of the tubular mandrel. Thus, the porous product water spacer material is in direct fluid communication with the tubular mandrel and the product water collected in the product water spacer material is required only to traverse a maximum of one-half revolution thereof to drain into the hollow tubular mandrel.

7 Claims, 4 Drawing Figures

REVERSE OSMOSIS MEMBRANE MODULE

BACKGROUND OF THE INVENTION

1. Field of the Invention

The present invention relates to a liquid purification apparatus operating on the principles of reverse osmosis and more particularly relates to a reverse osmosis membrane module assembly having a spiral wound membrane and to the method of manufacturing such a module.

2. Description of the Prior Art

In a reverse osmosis purification process, a diffusion of a solution through a semi-permeable membrane from a concentrated solution to a relatively more dilute solution, is brought about by placing the concentrated solution under a hydraulic pressure greater than the osmotic pressure differential across the membrane.

Systems using the process of reverse osmosis are well known in the art and have been utilized particularly in recent years for the purification of water for various purposes.

Reverse osmosis purification units invariably include, of course, a semi-permeable membrane and means for directing a concentrated solution to one side of the membrane and for drawing off a less concentrated solution from the other. Obviously, the rate of flow of product from the reverse osmosis unit is governed not only by the extent of the concentration as well as its pressure and temperature, but also by the area of membrane which can be exposed to the concentrate. To this end many different forms of reverse osmosis units have been devised with a view both toward maintaining a reasonable degree of compactness for the reverse osmosis unit while at the same time designing that unit with a view toward achieving a reasonably high product flow rate.

Some spiral wound modules have been designed with a multiple leaf construction and others with a single leaf construction such that the single leaf is rolled in the form of a scroll. In each case, the resulting reverse osmosis module comprises a membrane of relatively large surface area which is fitted about or wound on a mandrel and includes on both sides of the membrane throughout its length passages for the concentrate and for the product. These passages may simply comprise open spaces per se or more commonly are formed within porous spacer materials which are sandwiched between adjacent layers of semipermeable membrane.

Neither of the above mentioned types of units has proven entirely satisfactory. The multiple leaf units are difficult and expensive to manufacture while single leaf spiral-wound scroll-type units heretofore known have the great disadvantage that as membrane area is increased by increasing membrane length, the product must traverse a long path from the point of its first passage through the membrane to the point at which it finally passes into the product outlet from the reverse osmosis unit and frictional losses resulting from this long flow path create a large pressure drop which has the effect of substantially reducing the flow rate. This results in a substantial pressure differential throughout the length of the leaf which substantially impairs the efficiency of the unit.

SUMMARY OF THE INVENTION

The present invention relates to a spiral wound scroll-type membrane-module particularly adapted for water purification and resides particularly in an arrangement wherein means are provided to directly drain product water from each of a plurality of substantially concentric product water channels in the spiral wound membrane directly to a product water collection tube. Such an arrangement ensures that the product water must traverse a very small distance between adjacent windings of membrane support material before draining into the product water collection tube.

Such a module is capable of providing a minimum pressure drop in the porous membrane support material and a high rate of product water flow and has the added advantages that it can be readily and inexpensively manufactured on an automated basis and in sizes which are appreciably larger than those which can ordinarily be made by the single-leaf technique.

Under the circumstances, an important object of the invention resides in a multi-channel reverse osmosis membrane module wherein means are provided for directly draining each of a plurality of adjacent product water channels to a product water collection tube.

Another important feature of the invention is directed to such an arrangement wherein the module includes a spiral-wound membrane and the product water draining means includes a channel extending radially of the module and opening to each of a plurality of substantially concentric product water flow channels formed in the module intermediate substantially concentric membrane wrappings.

A more specific feature of the invention pertains to the method and means whereby a large flow rate reverse osmosis module can be produced by spiral winding a semi-permeable membrane with superposed feed and product water spacer materials lying adjacent opposite surfaces thereof and applying water impermeable cement to the feed water spacer material at fixed points so that with each wrap of the membrane, the cemented areas will adhere to the adjacent areas of membrane along a radius of the module and thereafter forming a radial opening through these cemented areas to provide a radial drain communicable with the product water spacer material along said radius in each wrap thereof without communicating the radial drain with water carried in the feed water spacer material.

BRIEF DESCRIPTION OF THE DRAWINGS

These and other objects, features, and advantages of the present invention will become apparent from time to time as the following specification proceeds and with reference to the accompanying drawing, wherein.

DESCRIPTION OF A PREFERRED EMBODIMENT

Figure 1:
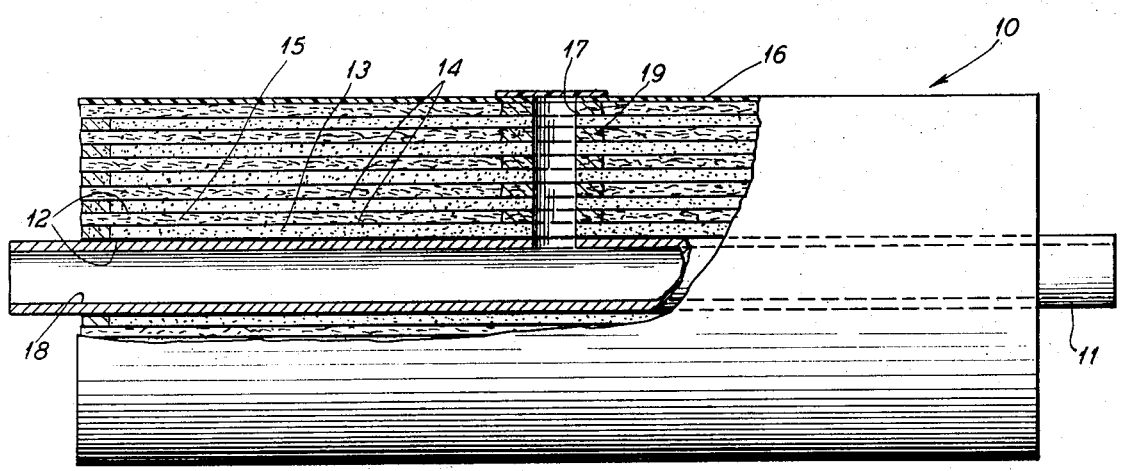
FIG. 1 is a partially elevational, partially sectioned view through a membrane-module assembly constructed in accordance with the principles of the present invention.
Figure 2:
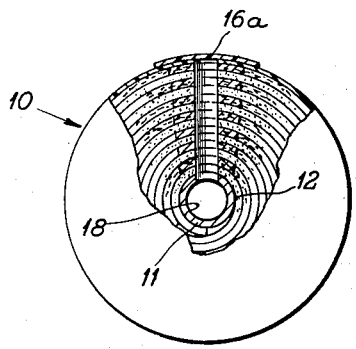
FIG. 2 is a transverse vertical sectional view through a radially directed product water drain bore of the membrane-module.
Figure 3:
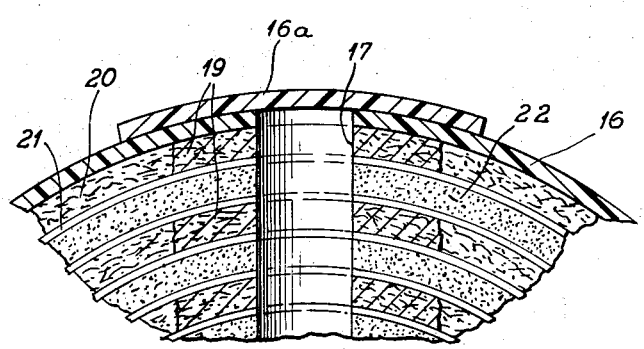
FIG. 3 is an enlarged fragmentary view of a portion of the vertical section illustrated in FIG. 2.
Figure 4:
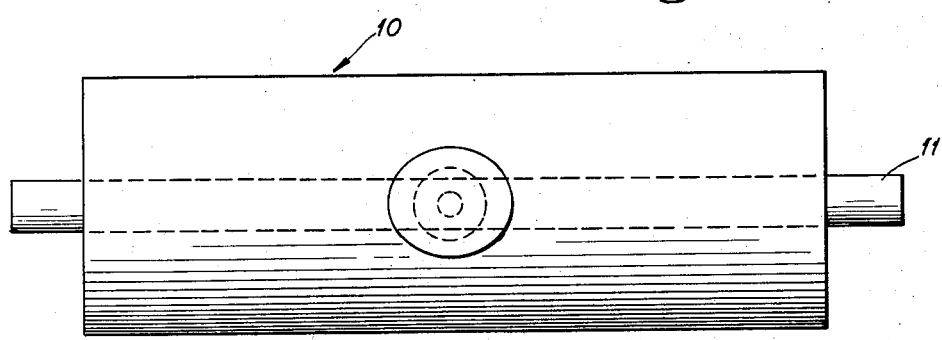
FIG. 4 is a plan view of the membrane-module illustrated in FIGS. 1 through 3.

Referring initially to FIGS. 1 through 4 there is shown a membrane-module 10 comprising a hollow tubular mandrel 11 about which is wound in fluid-tight relation a sandwich construction consisting of a semi-permeable membrane 12, a product water spacer material 13 which may consist of a porous spun-bonded polyester, a semi-permeable membrane 14 sealed at its ends to the membrane 12, and a feed water spacer material 15 which consists of a plastic mesh. The sandwich is tightly wrapped about the mandrel 11 a number of times depending upon the desired product water flow rate; a larger desired flow rate requiring a larger number of windings of the sandwich. The spiral wrapped mandrel is then wrapped with an impervious outer cover 16. The membrane material lying on opposite sides of the product water spacer material is sealed together at the ends of the module so that the end edges of the feed water spacer material are open to the end of the module while the end edges of the product water spacer material are closed.

The entire spiral wrapped mandrel comprising the reverse osmosis membrane module is designed to be placed within a suitable like contoured receptacle having inlet and outlet fittings opening into it and means for receiving the ends of the spiral wound module and for accommodating the interconnection between the product water collection tube and the point of utilization for that product water. Aqueous solution to be purified is passed through the receptacle inlet fitting and surrounds the membrane module and the water of the aqueous solution preferentially passes through the semi-permeable membrane and thence, as will hereinafter be explained, passes to the product water collection tube where it is directed to a point of utilization. The semi-permeable membrane is less permeable to the solute of the aqueous solution directed to the receptacle and is thus concentrated in the feed water flow channel and passes along with such excess water as cannot be handled by the capacity of the membrane-module, to and through the receptacle outlet either to a drain or to a point of recirculation back through the receptacle again. Such arrangements are old and well understood in this art and the entire modular system is, therefore, not herein further described in detail.

Various materials may be employed in a reverse osmosis system for the semi-permeable membrane although cellulose acetate formed in a single thin sheet is currently the preferred material.

The product water spacer material preferably comprises a relatively inexpensive highly porous material the properties of which permit a relatively unimpeded flow of a water therethrough and yet is capable of withstanding those pressures to which it is likely to be exposed including the pressure of the surrounding water without collapse or undue creep and is preferably formed of sufficiently flexible material that it can be supplied in large sheets from supply rolls and subsequently wound in a relatively tight roll about the mandrel 11 while maintaining its continuity. Such a porous material which is ideally suited to use in the instant embodiment is a spun-bonded polyester material such as that manufactured by E. I. duPont de Nemours & Co., Inc. of Wilmington, Del., and sold under the trade name of REEMAY.

The feed water spacer material 15 is likewise desirably supplied in long sheets from supply rolls and thence wound tightly around the mandrel 11. The feed water spacer material is preferably supplied in the form of an inexpensive mesh or grid-like structure such as a woven plastic screen in order to provide a tortuous path for the feed water to follow in passing through the module so as to prevent the accumulation of concentrated feed water at the surface of the membrane. Such plastic mesh materials, which are ideally suited for use in the present environment are those materials comprised of polyethylene or polypropylene and manufactured by the E. I. duPont de Nemours & Co., Inc. of Wilmington, Del., and sold under the trade name VEXAR.

In manufacturing the module of the present invention, the sandwich of membrane, REEMAY (product water spacer material), membrane, VEXAR (feed water spacer material) is wound in tight convolutions around the mandrel 11. With each winding a quantity of adhesive 19 is applied to the VEXAR screen or spacer material. Each application of adhesive fills the voids within the woven screen or mesh and adheres strongly to the adjacent areas of semi-permeable membrane so that the VEXAR at the point of adhesive application and the two adjacent membrane surfaces are tightly bonded together. Each such area of adhesive is applied so that the several areas of adhesive on successive layers of the sandwich lie along the same radial axis of the module (i.e., in line with one another). After having completed the winding operation a tape or cover 16 is wound about the module to enclose the entire unit. An opening 17 which will comprise a product flow passage is then bored or drilled radially through the module and into the interior of the mandrel 11 to the product flow passage 18 formed therein and this passage passes through the adhesive areas 19. The adhesive areas 19 are completely impermeable to water so that by boring the passage 17 through the module along the same transverse or radial axis as the adhesive areas 19 and through those adhesive areas (and with a smaller bore diameter than the diameters of the adhesive areas) each of the successive layers of product water spacer material (REEMAY) is completely open to the passage 17 while each of the successive layers of the feed water spacer material (VEXAR) is completely sealed (by the cement or adhesive 19) from the bore 17. A sealing tape 16a is placed on the cover 16 over the radial bore or passage 17 to close the end of the passage and it may, if necessary, have a stiffening member (not shown) underlie it to prevent it from collapsing into the bore.

The passage 17 opens to the product flow passage 18 formed within the mandrel 11 and, as has already been noted, this passage is connected by suitable means with a point of utilization for the product water. It will be apparent then that the solvent from a feed water solution initially disposed within the outermost layer 20 of the feed water spacer material (VEXAR) can permeate through the adjacent semi-permeable membrane 21 to the adjacent layer of product water spacer material 22 (REEMAY) and such solvent as passes through that membrane layer to the outermost layer of product water spacer material can pass directly to the passage 17 and thence to the product water flow passage 18 in the mandrel 11 to the point of utilization rather than having to traverse the convoluted tortuous path which product water ordinarily must traverse in other spiral wound single leaf reverse osmosis membrane-module assemblies.

It will, of course, be understood that numerous cored product water passages or bores can be provided at various points along the length of the module either in a straight line or at various angles to one another.

I claim as my invention:

1. A membrane module comprising a hollow tubular mandrel, a sandwich including a semi-permeable membrane, a porous product water spacer material, a semi-permeable membrane and a porous feed water spacer material; wherein said sandwhich is spirally wrapped about said mandrel; water-impermeable adhesive means filling the pores of said feed water spacer material at points lying along at least one radius of said module and adhering at adjacent areas of two semi-permeable membranes to one another; a passage extending radially through said module and through said adhesive means and opening to the hollow interior of said tubular mandrel; wherein impermeable means close the end of said passage at its point of exit from the outer wrap of said module; whereby said passage is in open fluid communication with each of said product water spacer materials and in closed fluid communication with each of said feed water spacer materials.

2. A membrane module comprising a central core member defining a product water passageway; a continuous multi-layer composite comprising alternate layers of product and feed water spacer materials having semi-permeable membrane materials sandwiched therebetween; water-impermeable adhesive means bonding said feed water spacer material to adjacent areas of semi-permeable membrane; whereby said adhesive means are applied to said feed water spacer material at points extending along the same transverse axis of said module; a product water passage extending along the same said transverse axis through said adhesive means to communicate said product water passageway with each layer of said product water spacer material.

3. A membrane module comprising a continuous multi-layered composite including alternate layers of product and feed water spacer materials having a semi-permeable membrane sandwiched therebetween; a hollow core; said composite being spirally wound about said core; and means providing open fluid communication along a radial axis of said module between each successive layer of product water spacer material and said hollow core.

4. A membrane module constructed in accordance with claim 1 wherein said product water spacer material comprises a collapse resistance porous material such as spun-bonded polyester.

5. A membrane module constructed in accordance with claim 1 wherein said feed water spacer material comprises a plastic mesh formed from the group consisting of polyethylene and polypropylene.

6. A membrane module constructed in accordance with claim 1 wherein said feed water spacer material comprises a plastic mesh and wherein said adhesive means fills the interstices within said mesh and joins the two adjacent semi-permeable membrane surfaces.

7. A membrane module constructed in accordance with claim 2 wherein said feed water spacer material comprises a plastic mesh and wherein said adhesive means fills the interstices within said mesh and joins the two adjacent semi-permeable membrane surfaces.

* * * * *